United States Patent
Nomoto et al.

[11] Patent Number: 5,806,639
[45] Date of Patent: Sep. 15, 1998

[54] FLUID COUPLING WITH A LOCK-UP CLUTCH

[75] Inventors: Hisanori Nomoto; Kiyohito Murata, both of Susono; Yoshio Shindo, Numazu, all of Japan

[73] Assignee: Toyota Jidosha Kabushiki Kaisha, Toyota, Japan

[21] Appl. No.: 810,996

[22] Filed: Feb. 27, 1997

Related U.S. Application Data

[62] Division of Ser. No. 364,789, Dec. 27, 1994, Pat. No. 5,636,718.

[30] Foreign Application Priority Data

Dec. 27, 1993 [JP] Japan .................................. 5-331631
Dec. 28, 1993 [JP] Japan .................................. 5-334748

[51] Int. Cl.⁶ .................................................. F16H 45/02
[52] U.S. Cl. ...................... 192/3.29; 192/3.3; 192/213.1
[58] Field of Search ............................. 192/3.28, 3.29, 192/3.3, 213.1, 213.2; 464/67, 68

[56] References Cited

U.S. PATENT DOCUMENTS

| | | | |
|---|---|---|---|
| 3,189,144 | 6/1965 | Gabriel | 192/3.29 |
| 3,275,108 | 9/1966 | General et al. | 192/3.3 |
| 5,086,892 | 2/1992 | Schierling . | |
| 5,129,493 | 7/1992 | Edmunds . | |
| 5,139,122 | 8/1992 | Maeda et al. | 192/3.29 |
| 5,195,621 | 3/1993 | Dull et al. . | |
| 5,348,127 | 9/1994 | Murata et al. . | |
| 5,377,796 | 1/1995 | Friedmann et al. | 192/3.29 |
| 5,386,896 | 2/1995 | Matsuoka | 192/3.29 |
| 5,513,731 | 5/1996 | Matsuoka | 192/3.29 |

FOREIGN PATENT DOCUMENTS

| | | |
|---|---|---|
| 0 001 839 | 5/1979 | European Pat. Off. . |
| 0 078 651 | 5/1983 | European Pat. Off. . |
| 0 476 433 | 3/1992 | European Pat. Off. . |
| 0 533 426 | 3/1993 | European Pat. Off. . |
| 2 626 053 | 7/1989 | France . |
| 2 690 214 | 10/1993 | France . |
| 39 38 724 | 5/1991 | Germany . |
| 43 22 505 | 1/1994 | Germany . |
| 4-151056 | 5/1992 | Japan . |
| 5-187518 | 7/1993 | Japan . |

*Primary Examiner*—Richard M. Lorence
*Attorney, Agent, or Firm*—Oblon, Spivak, McClelland, Maier & Neustadt, P.C.

[57] ABSTRACT

A fluid coupling with a lock-up clutch which is capable of an improved torque transmission is provided. The fluid coupling with a lock-up clutch according to the present invention comprises, a front cover connected to an input shaft, an impeller shell connected to the front cover, a hub connected to an output shaft, a turbine shell connected to the hub at radially inner end, a driven plate assembly disposed near the outer surface of the turbine shell, a drive disc assembly disposed between the front cover and the driven plate assembly. The driven plate assembly has a driven plate which is rotatable in company with the hub, an annular friction surface disposed on the surface of front cover side of the driven plate. The drive disc assembly has a spring locator connected to the front cover, damper springs located in the spring locator, a front drive disc disposed on the front cover side of the spring locator, and a rear drive disc disposed on the driven plate assembly side of the spring locator. On the rear drive disc, a friction surface is disposed toward and selectively engageable with the annular friction surface disposed on the driven plate. The front drive disc and the rear drive disc are connected to each other at least at two different radial position and support the damper springs by co-operating with each other. Preferably, the driven plate are connected to the turbine shell at radially inner end portion and radially outer end portion so that the driven plate covers the whole outer surface of the turbine shell.

12 Claims, 18 Drawing Sheets

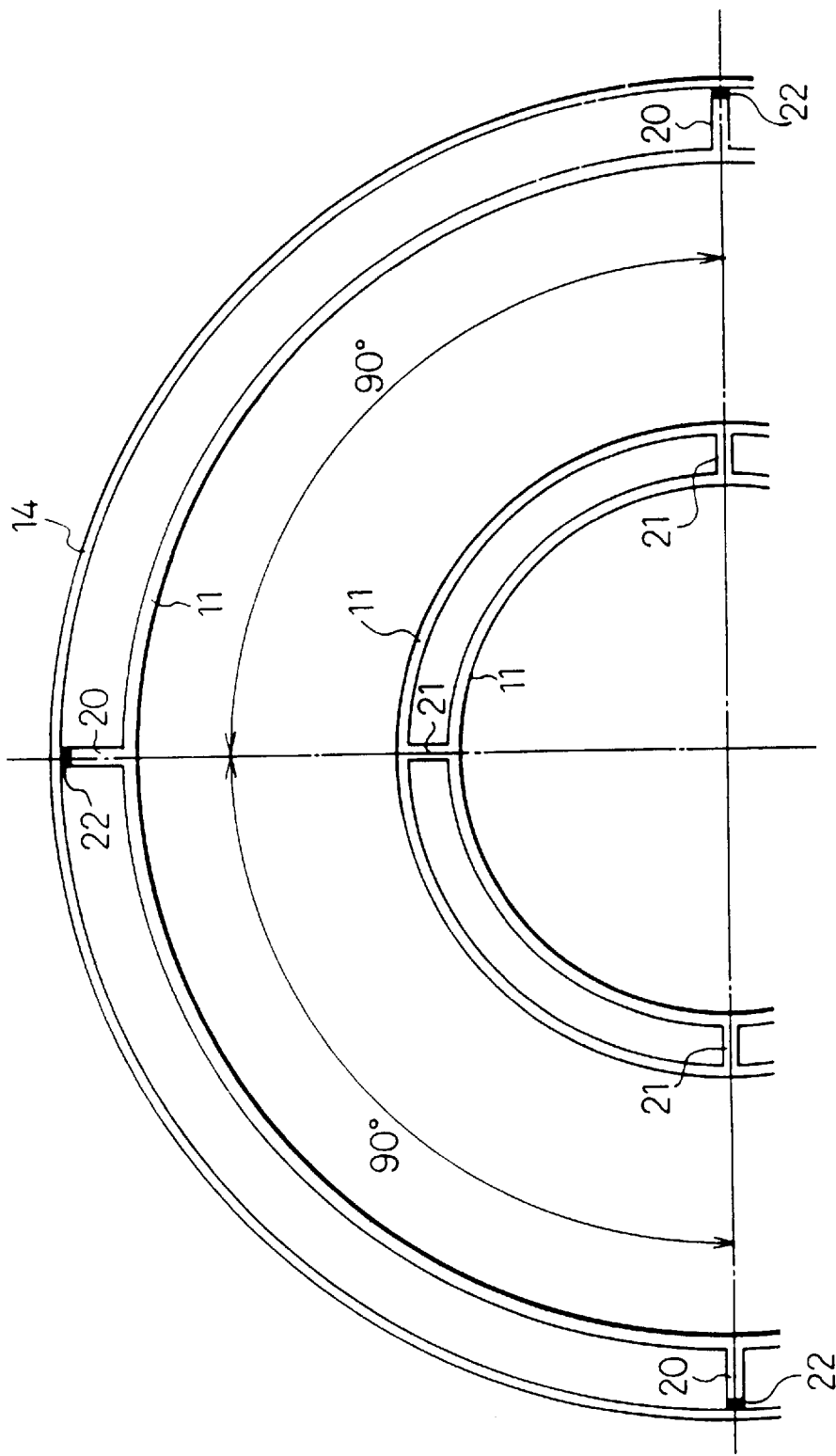

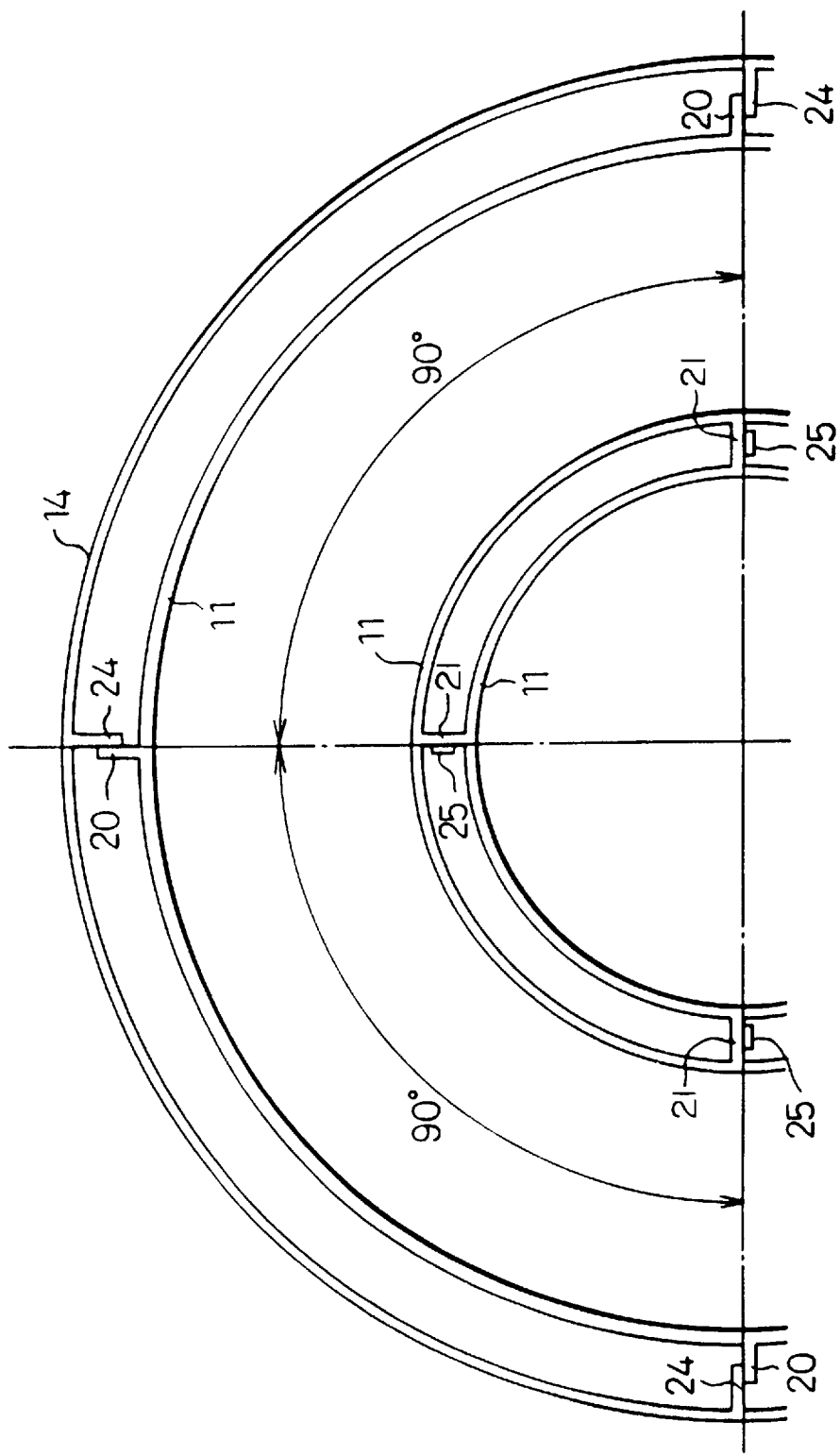

FLUID COUPLING WITH A LOCK-UP CLUTCH

This is a Division of application Ser. No. 08/364,789 filed on Dec. 27, 1994 now U.S. Pat. No. 5,636,718.

BACKGROUND OF THE INVENTION

1. Field of the Invention

The present invention relates to a fluid coupling with a lock-up clutch and especially relates to a fluid coupling with a lock-up clutch used in an automobile as a torque converter.

2. Description of the Related Art

A fluid coupling with a lock-up clutch is commonly used in an automobile as a torque converter.

In a known fluid coupling with a lock-up clutch, a drive disc assembly, which is connected to a front cover through damping mechanism, is disposed close to the front cover and a driven plate assembly which is connected to a hub at an inner end is disposed between the drive disc assembly and a turbine shell. The front cover of the fluid coupling is fixed to an input shaft and the hub is fixed to an output shaft (Japanese Unexamined Patent Publication "kOKAI"5-187518). In this type of fluid coupling with a lock-up clutch, a front drive disc and a rear drive disc, which are the components of the drive disc assembly, are connected to each other only at their midpoints. Therefore, the drive disc assembly does not have high rigidity and is easy to deform.

As a result, the drive disc assembly and the driven plate assembly are not engaged to each other at constant position, and the of torque transmitting capacity in a lock-up condition is low. Therefore, it is necessary to increase the thickness of the drive discs to obtain higher rigidity. This causes an increase in the axial length of the automatic transmission, which results in poor mountability of the automatic transmission in a body of automobile, and increase in weight which results in poor fuel consumption.

In other fluid couplings with a lock-up clutches, the driven plate is disposed directly on the outer surface of turbine shell and in a radially outer area (U.S. Pat. No. 5,195,621). In this type of fluid coupling with a lock-up clutch, turbine blades are fixed to the inner surface of a turbine shell throughout the whole radial length of the turbine shell by inserting one end of the turbine blade into slits which are formed on the turbine shell and then brazing the blades. Therefore, if the brazing is broken by repeated deformation of the turbine shell, the oil filled on the inner side of the turbine shell will leak to the space between the outer surface of the turbine shell and the drive disc assembly. As a result, it would be difficult to obtain desirably low oil pressure-in the space between the outer surface of the turbine shell and the drive disc assembly, so that the torque transmitting capacity of the fluid coupling at a lock-up will be low.

SUMMARY OF THE INVENTION

Therefore, an object of the present invention is to provide a fluid coupling with a lock-up clutch, having a high rigidity drive disc assembly and a high rigidity driven plate assembly, which is capable of a improved torque transmission.

According to the present invention, there is provided a fluid coupling with a lock-up clutch, which comprises a front cover connected to an input shaft, an impeller shell connected to the front cover, a hub connected to an output shaft, a turbine shell connected to the hub, a driven plate assembly disposed near the outer surface of the turbine shell and a drive disc assembly disposed between said front cover and said driven plate assembly. The driven plate assembly has a driven plate connected to the hub, and an annular friction surface disposed on the surface of front cover side of the driven plate. The drive disc assembly has a spring locator connected to the front cover, damper springs located in the spring locator, a front drive disc disposed on the front cover side of the spring locator, a rear drive disc disposed on the driven plate assembly side of the spring locator and connected to the front drive disc and supporting the damper springs by co-operating with the front drive disc, and a friction surface disposed on the rear drive disc facing and selectively engageable with the annular friction surface disposed on the driven plate. The front drive disc and the rear drive disc are connected to each other at least at two different radial positions.

The present invention will be more fully understood from the description of preferred embodiments of the invention set forth below, together with the accompanying drawings.

BRIEF DESCRIPTION OF THE DRAWINGS

In the drawings;

FIG. 2a is a front view of a drive disc assembly of the first embodiment of a fluid coupling with a lock-up clutch shown in FIG. 1;

FIG. 2b is a sectional side view of a drive disc assembly taken along the line I—I of FIG. 2a;

FIG. 11 is a sectional view of a driven plate and turbine shell taken along the line II—II and II'—II' of FIG. 10;

FIG. 12b is a perspective view of the seal member shown in FIG. 12a;

FIG. 18 is a partial sectional view of a driven plate and turbine shell taken along the line V—V and V'—V' of FIG. 17.

DESCRIPTION OF THE PREFERRED EMBODIMENTS

Figure 1:
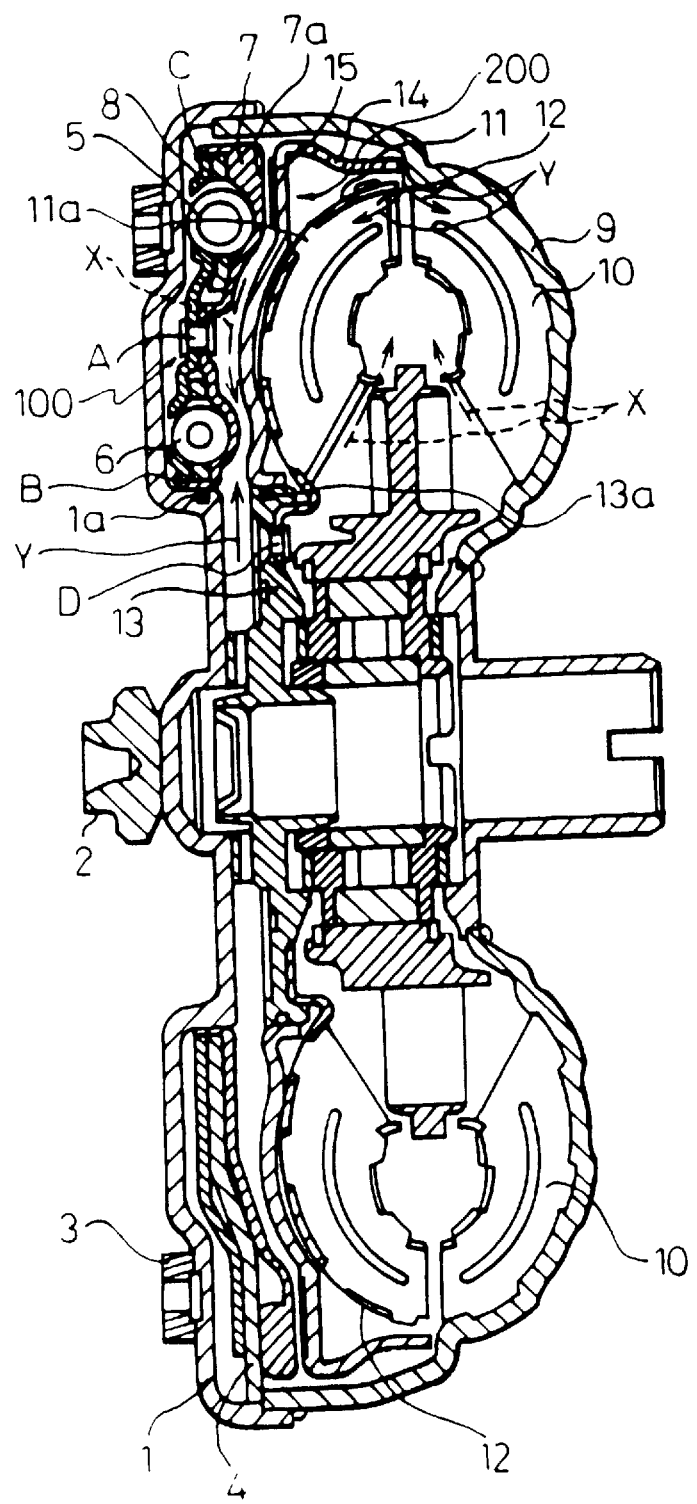
FIG. 1 is a sectional side view of the first embodiment of a fluid coupling with a lock-up clutch according to the present invention.

FIG. 1 is a side sectional view of the first embodiment of the present invention.

In FIG. 1, reference numeral 1 represents a front cover. An input shaft (not shown) which is connected to an engine output shaft (not shown) is connected to the front cover 1 through a connecting member 3 after its position is adjusted by a positioning member 2. Reference numeral 100 generally represents a drive disc assembly, which is composed of a spring locator 4, first damper springs 5, second damper springs 6, a rear drive disc 7 and a front drive disc 8.

The spring locator 4 is connected to the front cover 1 at radially outer end. The first damper springs 5 and the second damper springs 6 are located in holes 4a (shown in FIG. 2a) formed on the spring locator 4. The rear drive disc 7 and the front drive disc 8 are formed to loosely cover the spring locator 4 and the first damper springs 5 and the second damper springs 6, and are connected to each other by riveting at the radially midway point "A", and by welding at the radially inner end point "B" and the radially outer end point "C".

The rear drive disc 7 is bent toward the front drive disc 8 at its inner end and axially slidably contacts with the front cover 1. Reference numeral 1a represents an oil seal. A frictional surface 7a is formed on the outer surface of the rear drive disc 7 at a radially outer portion. The frictional surface is flat and substantially perpendicular to the axis of rotation.

An impeller shell 9 is connected to the front cover 1. Impeller blades 10 are attached on the inner surface of the impeller shell 9.

A turbine shell 11 is connected to a hub 13 by riveting at the radially inner end point "D". Turbine blades 12 are attached on the inner surface of the turbine shell 11 by inserting part of the outer periphery of each blade 12 into slits 11a formed on the turbine shell 11 and brazing the end of the blades.

The hub 13 is connected to an output shaft (not shown).

Reference numeral 200 generally represents a driven plate assembly, which is composed of a driven plate 14 and an annular friction disc 15 which is bonded on the driven plate 14. The driven plate 14 is axially slidably connected to the hub 13. The reference numeral 13a represents the oil seal.

The engine torque is transmitted to the output shaft (not shown) in the known way as described below.

The engine torque from a crankshaft (not shown) drivingly rotates the front cover 1. Then, the front cover 1 drivingly rotates the spring locator 4. Then, edges of the holes 4a (shown in FIG. 2a) in which the damper springs 5 and 6 are located drivingly push one end of each of the damper springs 5 and 6. Then, the other end of each of those damper springs 5 and 6 drivingly pushes the rear drive disc 7 and front drive disc 8.

To attain a lock-up condition, oil is supplied as shown by arrow X (dotted line), so that the oil pressure in the space between the driven plate 14 and the rear drive disc 7 becomes lower than the oil pressure in the space between the front drive disc 8 and the cover 1 and lower than the oil pressure in the space between the driven plate 14 and the outer surface of the turbine shell 11. Then, the drive disc assembly 100 and the driven plate assembly 200 move close to each other, so that the friction surface 7a formed on the rear drive disc 7 and the friction disc 15 disposed on the driven plate 14 are engaged with each other. The driven plate 14 rotates with the hub 13 which is connected to the output shaft. Therefore, the engine torque is transmitted to the output shaft from rear drive disc 7 without using a fluid coupling between the impeller shell 9 and the turbine shell 11.

To attain a non-lock-up condition, oil is supplied as shown by arrow Y (solid line), so that the oil pressure in the space between the driven plate 14 and the rear drive disc 7 does not becomes lower than the oil pressure in the space between the front drive disc 8 and the cover 1, or lower than the oil pressure at the space between the driven plate 14 and the outer surface of the turbine shell 11. Therefore, the drive disc assembly 100 and the driven plate assembly 200 are kept apart from each other, so that the friction surface 7a formed on the rear drive disc 7 and the friction disc 15 disposed on the driven plate 14 are not engaged. Therefore, the engine torque is not transmitted to the output shaft through the drive disc assembly 100. The engine torque is transmitted from front cover 1 to the output shaft in the known way using the fluid coupling between the impeller shell 9 and turbine shell 11.

Figure 2:
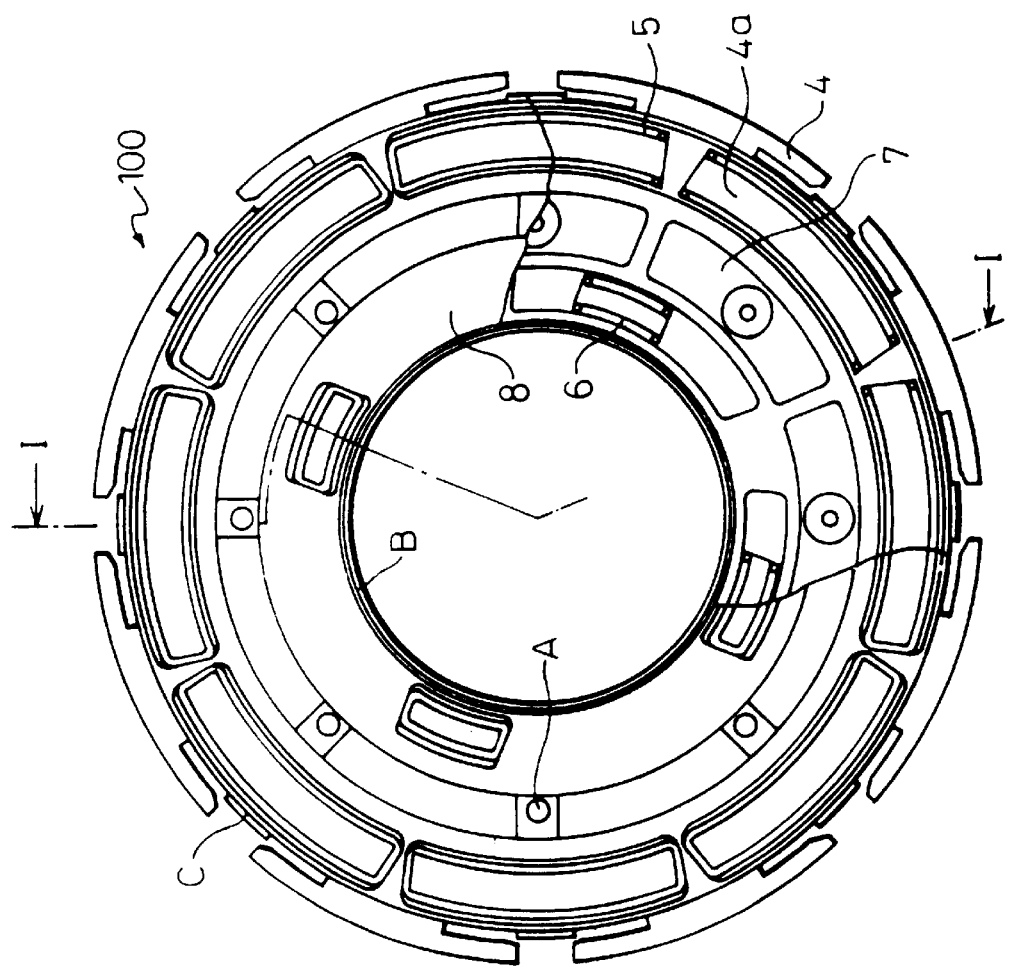

FIG. 2a and FIG. 2b, partly show the drive disc assembly 100 in front view and side view, respectively. As shown in FIG. 2a, eight of the first damper springs 5 and four of the second damper springs 6 are used in the first embodiment of the invention.

Figure 3:
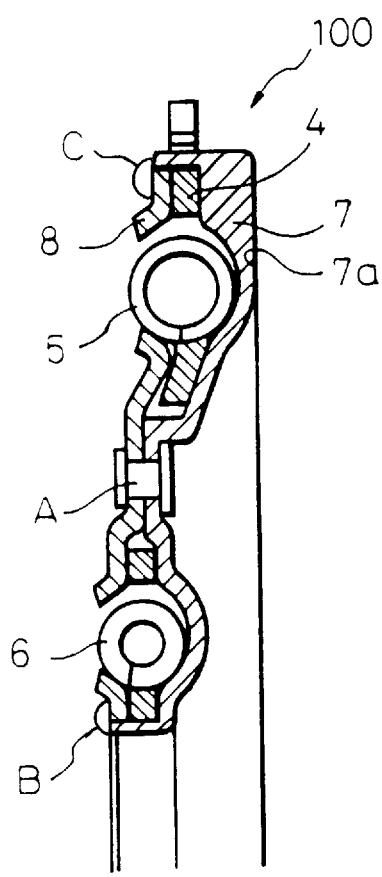
FIG. 3 is an enlarged partial sectional side view of a drive disc assembly of the first embodiment.

FIG. 3 more clearly shows how the rear drive disc 7 and the front drive disc 8 are connected in the drive disc assembly 100.

As shown in FIG. 3, the portion radially outside of point "A" and the portion radially inside of point "A" both have box section, so that high rigidity is attained, even if thinner material is used for the rear drive disc 7 and the front disc 8. Therefore, it is possible to decrease the axial length of the transmission.

As a result, the designing of the fluid coupling can be performed with fewer restrictions and less weight and better fuel consumption, less material cost and less machining cost is attainable.

Figure 4:
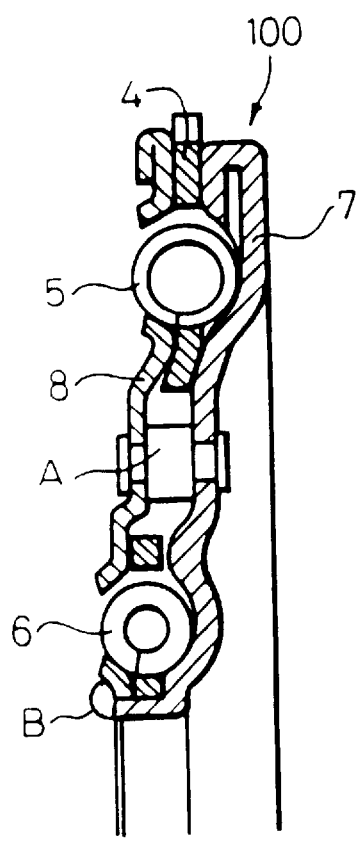
FIG. 4 is an enlarged partial sectional side view of a drive disc assembly of the second embodiment.

In the second embodiment of the present invention, as shown in FIG. 4, the rear drive disc 7 and the front drive disc 8 are connected to each other by riveting at point "A" while keeping them apart from each other, and by welding at point "B". The portion radially inside of point "A" has stronger box section than the one formed in the first embodiment. Therefore, according to the second embodiment of the present invention, the drive disc can have a rigidity almost the same as the first embodiment, even though rear drive disc 7 and the front drive disc 8 are not connected at point "C".

Figure 5:
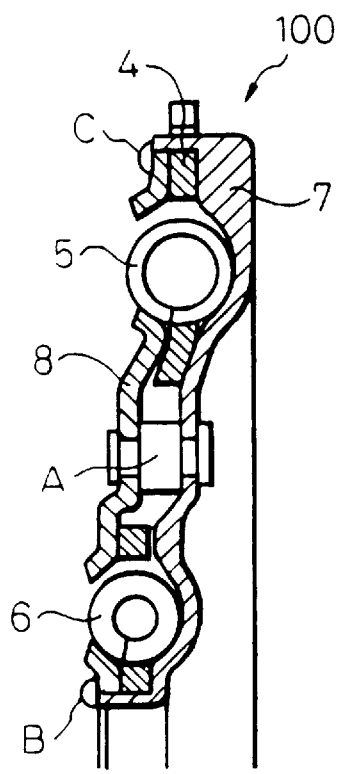
FIG. 5 is an enlarged partial sectional side view of a drive disc assembly of the third embodiment.

In the third embodiment of the present invention shown in FIG. 5, the rear drive disc 7 and the front drive disc 8 are connected to each other by riveting at point "A" while keeping them apart from each other, and by welding at point "B" and "C". Therefore, the portion radially outside of point "A" and the portion radially inside of point "A" both have stronger box section than the one formed in the first embodiment or the second embodiment. Therefore, a high rigidity of 15 the drive disc assembly is attainable than in the first or second embodiments, and engine torque transmission would be improved.

Figure 6:
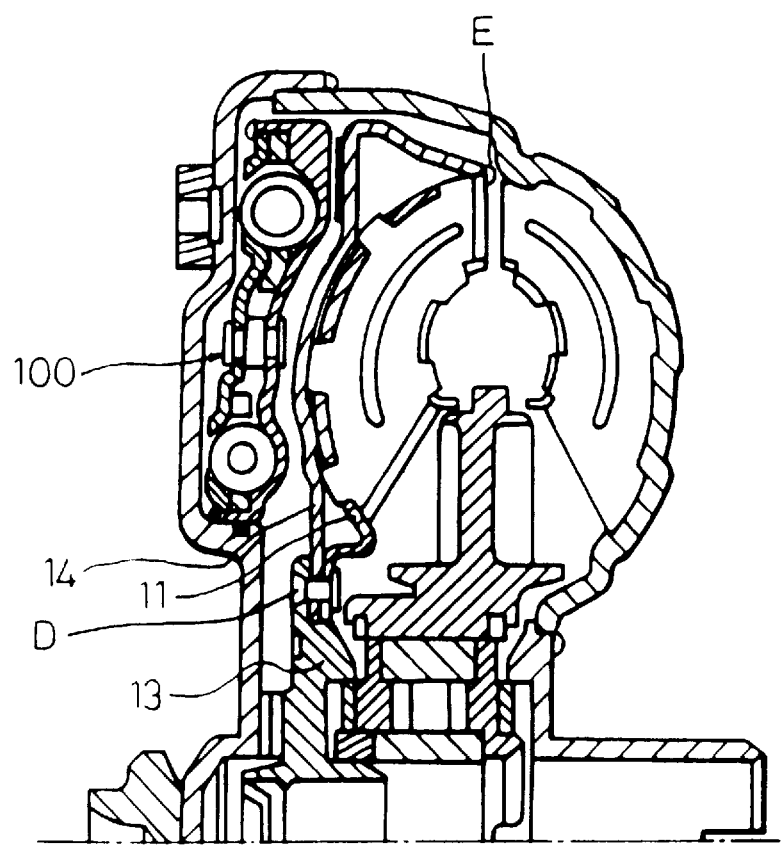
FIG. 6 is a sectional side view of the fourth embodiment.

In the fourth embodiment of the present invention shown in FIG. 6, in addition to the drive disc assembly 100 of the third embodiment, the drive plate 14 and turbine shell 11 are connected to each other at radially outer end point "E" of the turbine shell 11 by welding and, at radially inner end portion, the drive plate 14 and turbine shell 11 are closely contacted to each other and connected to the hub 13 by riveting at point "D".

Therefore, the turbine shell 11 and the driven plate 14 are united and the whole of the outer surface of the turbine shell 11 is covered by the drive plate 14. As a result, the drive plate 14 attains a higher rigidity than the third embodiment, and the drive plate 14 is never moved undesirably by the oil which leaks from the connecting portion of the turbine blades 12 to the turbine shell 11 if the brazing is broken after repeated deformation of the turbine shell 11. Thus, torque transmission would be improved compared to the third embodiment. In addition, a quick change from lock-up condition to non-lock-up condition is attainable, because the driven plate assembly 200 can return to a free position by the elasticity of the driven plate assembly 200 itself.

Also, oil seal 13a can be eliminated.

Figure 7:
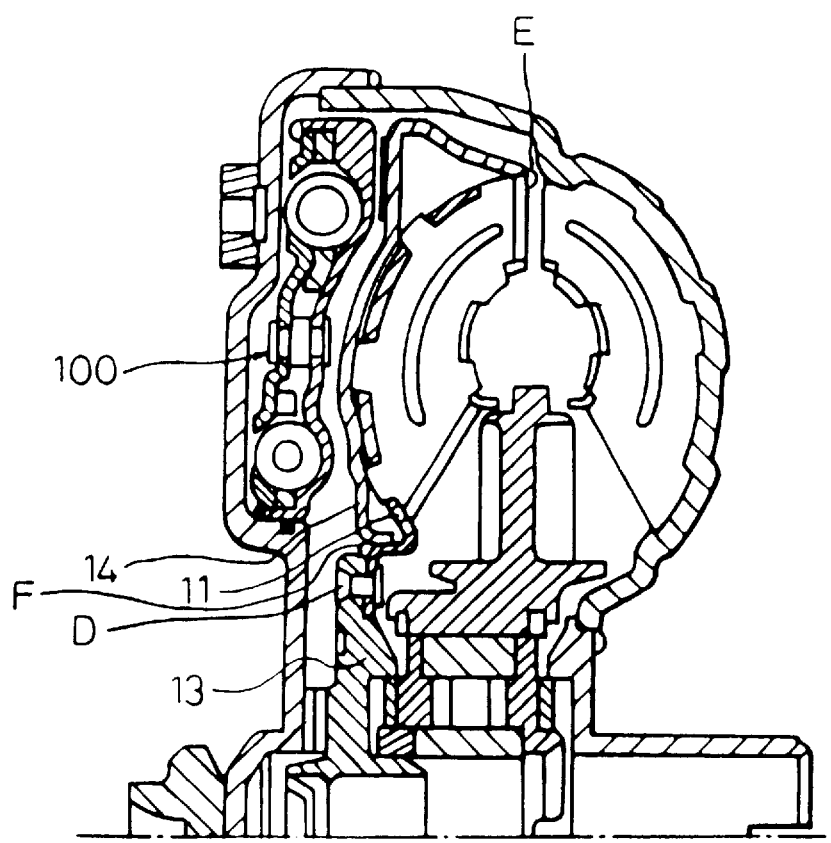
FIG. 7 is a partial sectional side view of the fifth embodiment.

The fifth embodiment of the present invention shown in FIG. 7 is an alternative to the fourth embodiment. In the fifth embodiment, as shown in FIG. 7, the driven plate 14 is connected to the turbine shell 11, which is itself connected to the hub 13 by riveting at point "D", by welding at point "F".

Figure 8:
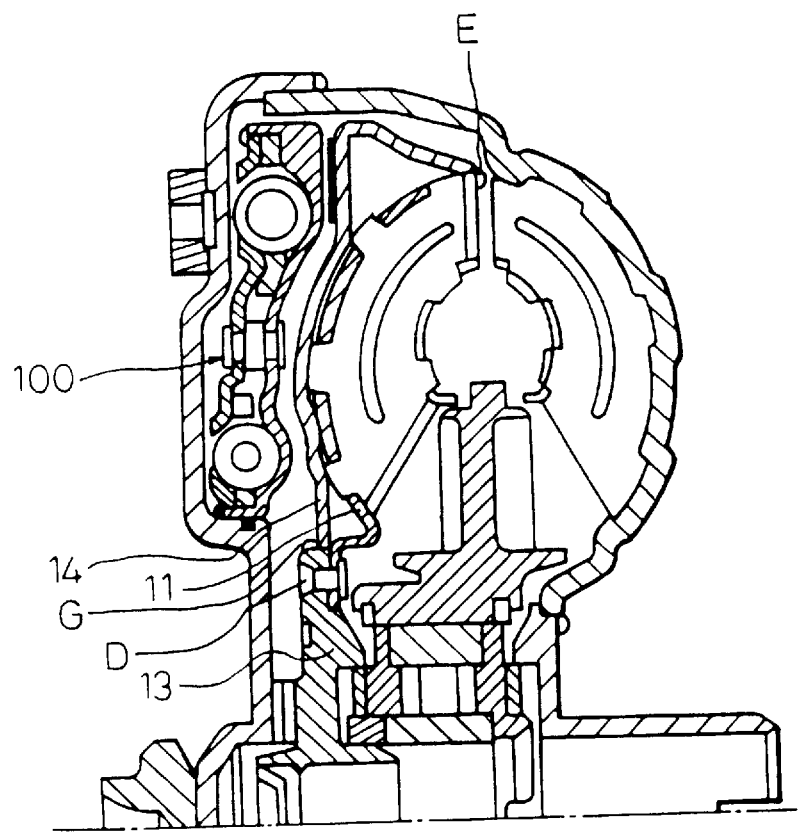
FIG. 8 is a partial sectional side view of the sixth embodiment.

The sixth embodiment of the present invention shown in FIG. 8 is another alternative to the fourth embodiment. In the sixth embodiment of the present invention, as shown in FIG. 8, the driven plate 14 is connected to the hub 13 by welding at point "G" and the turbine shell 11 is connected to the hub 13 by riveting at point "D".

Figure 9:
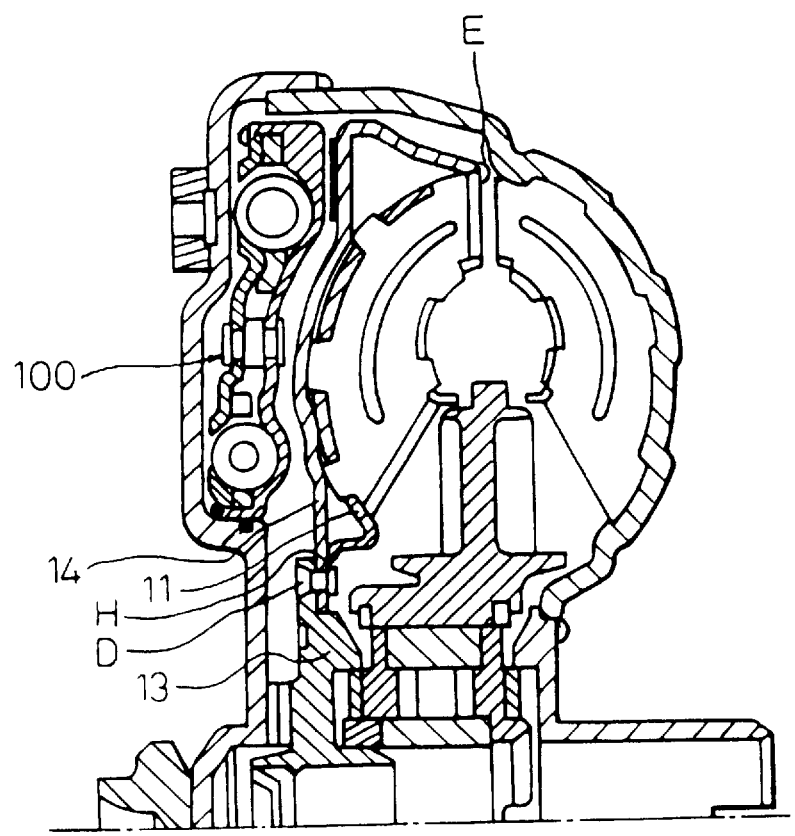
FIG. 9 is a partial sectional side view of the seventh embodiment.

The seventh embodiment of the present invention shown in FIG. 9 is another alternative to the fourth embodiment. In the seventh embodiment of the present invention, as shown in FIG. 9, the driven plate 14 is connected to the hub 13 by riveting at point "D" and the turbine shell 11 is connected to-the driven plate 11 by welding at point "H".

According to the above described fifth, sixth and seventh embodiments, the same effects as in the fourth embodiment are attainable.

Figure 10:
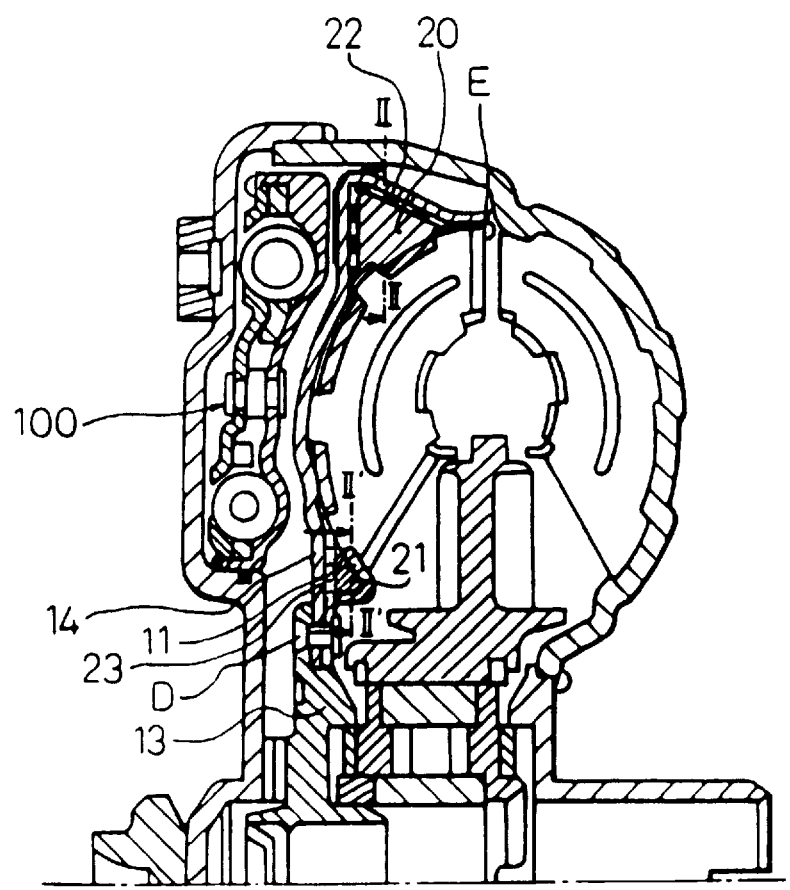
FIG. 10 is a partial sectional side view of the eighth embodiment.

In the eighth embodiment shown in FIG. 10 and FIG. 11, ribs 20 and 21 are disposed in the annular spaces formed near the radially outer end and near the radially inner end between the driven plate 14 and the outer surface of the turbine shell 11 at substantially equal intervals around the circumference.

The ribs 20 are substantially triangular and fixed to the outer surface of the turbine shell 11 at one side and contact to the driven plate 14 through seal member 22 at the remaining sides.

The ribs 21 are also substantially triangular and fixed to the outer surface of the turbine shell 11 at two sides and contact to the driven plate 14 through seal member 23 at the remaining side.

As shown in FIG. 11, the ribs 20 and ribs 21 are respectively disposed at intervals of 90 degree around the circumference.

According to the above described eighth embodiment of the present invention, turbine shell 11 and drive plate 11 can attain higher rigidity and torque transmission would be improved compared to the fourth, fifth, sixth and seventh embodiment, and also the noise and vibration of the torque converter is decreased because the oil flow into the space between the outer surface of the turbine shell 11 and the driven plate 14 is kept even by the ribs 20 and 21 and acts as a inertial weight for balancing.

FIG. 12a through FIG. 12d show the details of the seal members.

Figure 12C:
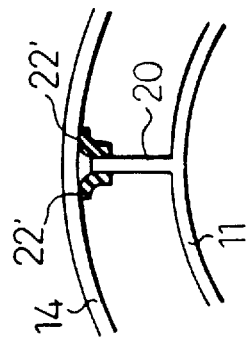
FIG. 12c is a partial sectional view of an alternative seal member and a rib.
Figure 12D:
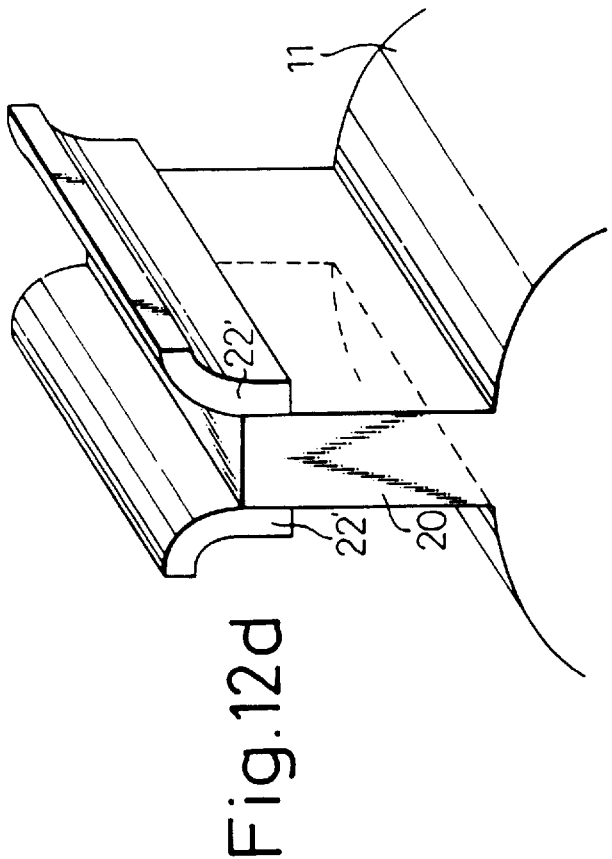
FIG. 12d is a perspective view of the seal member shown in FIG. 12c.
Figure 12A:
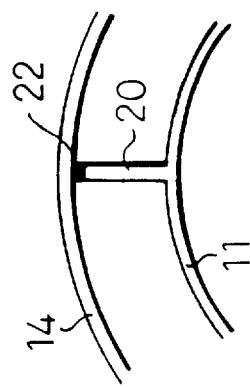
FIG. 12a is a partial sectional view of a seal member and a rib.
Figure 12B:
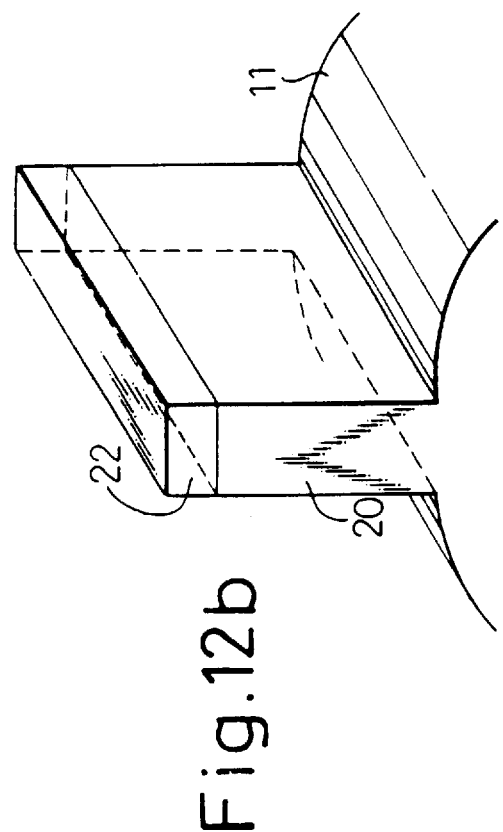

FIG. 12a is a enlarged partial view of the rib 20 and the seal member 22, and FIG. 12b is a schematic perspective view of them. As shown in FIG. 12b, the seal member 22 is attached on a radially outer side of the rib 20. FIG. 12c and FIG. 12d show an alternative to the seal member, in which seal member 23 is attached to both of the side surfaces of the rib 20 near a radially outer end.

Figure 13:
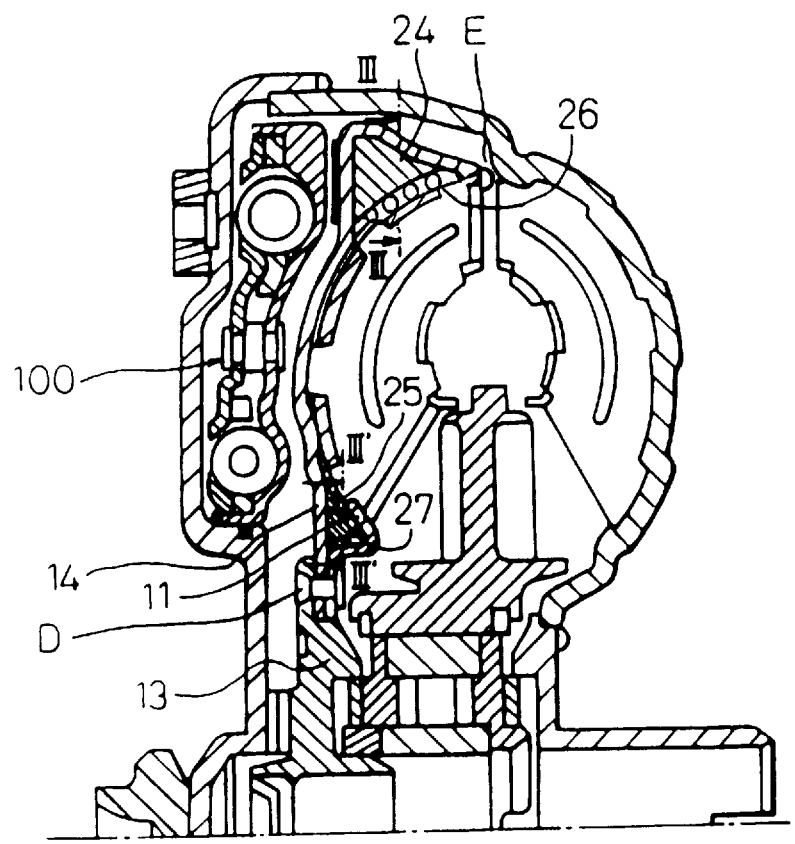
FIG. 13 is a partial sectional side view of ninth embodiment.
Figure 14:
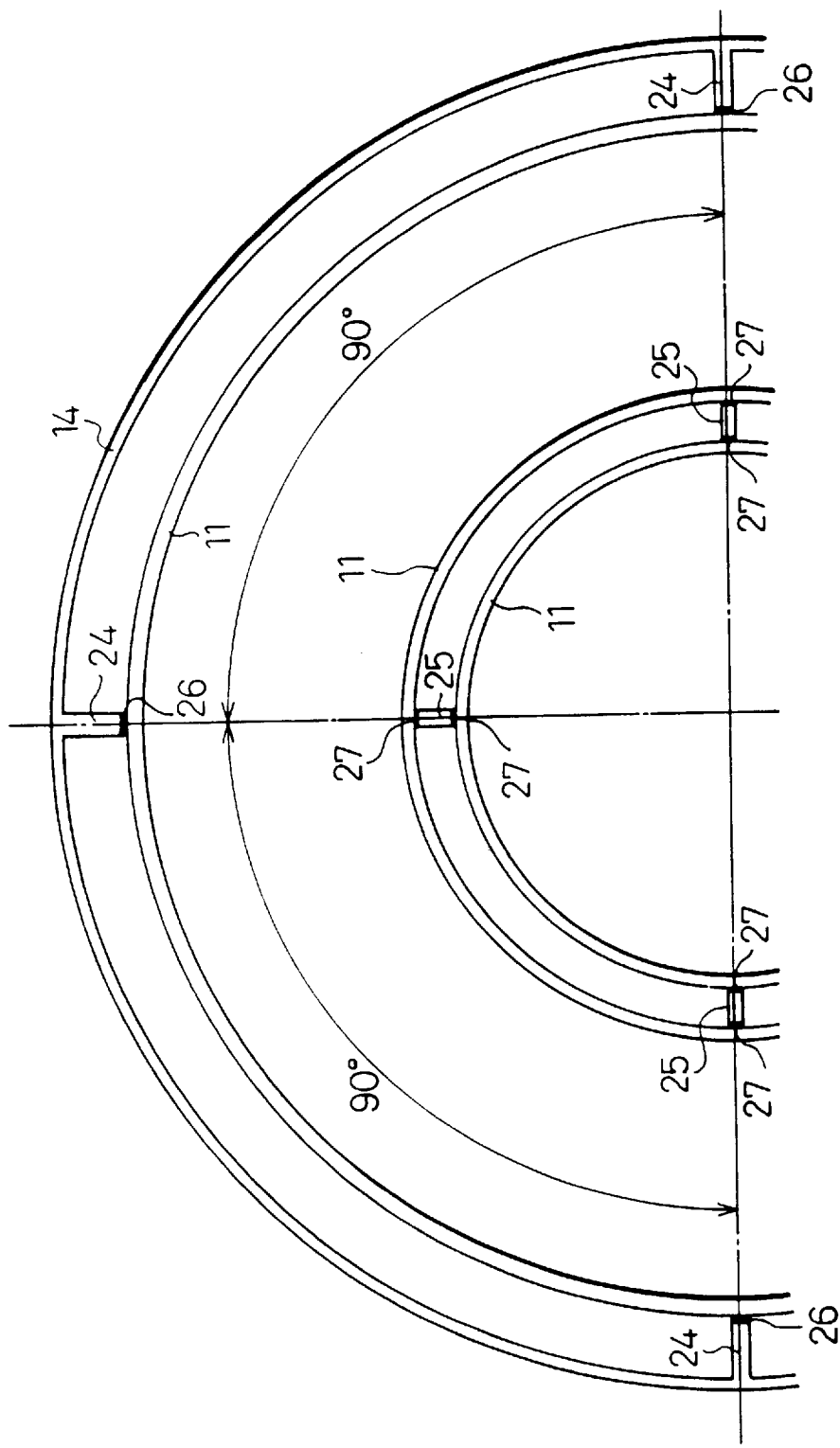
FIG. 14 is a partial sectional view of a driven plate and turbine shell taken along the line III—III and III'—III' of FIG. 13.

In the ninth embodiment of the present invention shown in FIG. 13 and FIG. 14, contrary to the eighth embodiment, the ribs 24 are fixed to the driven plate 14 at two sides and contact to the outer surface of the turbine shell 11 through seal member 26 at remaining side, and the ribs 25 are fixed to the driven plate 14 at one side and contact to the outer surface of the turbine shell 11 through seal member 27 at the remaining sides.

According to the above described ninth embodiment of the present invention, the same effects as in the eighth embodiment are attainable.

Figure 15:
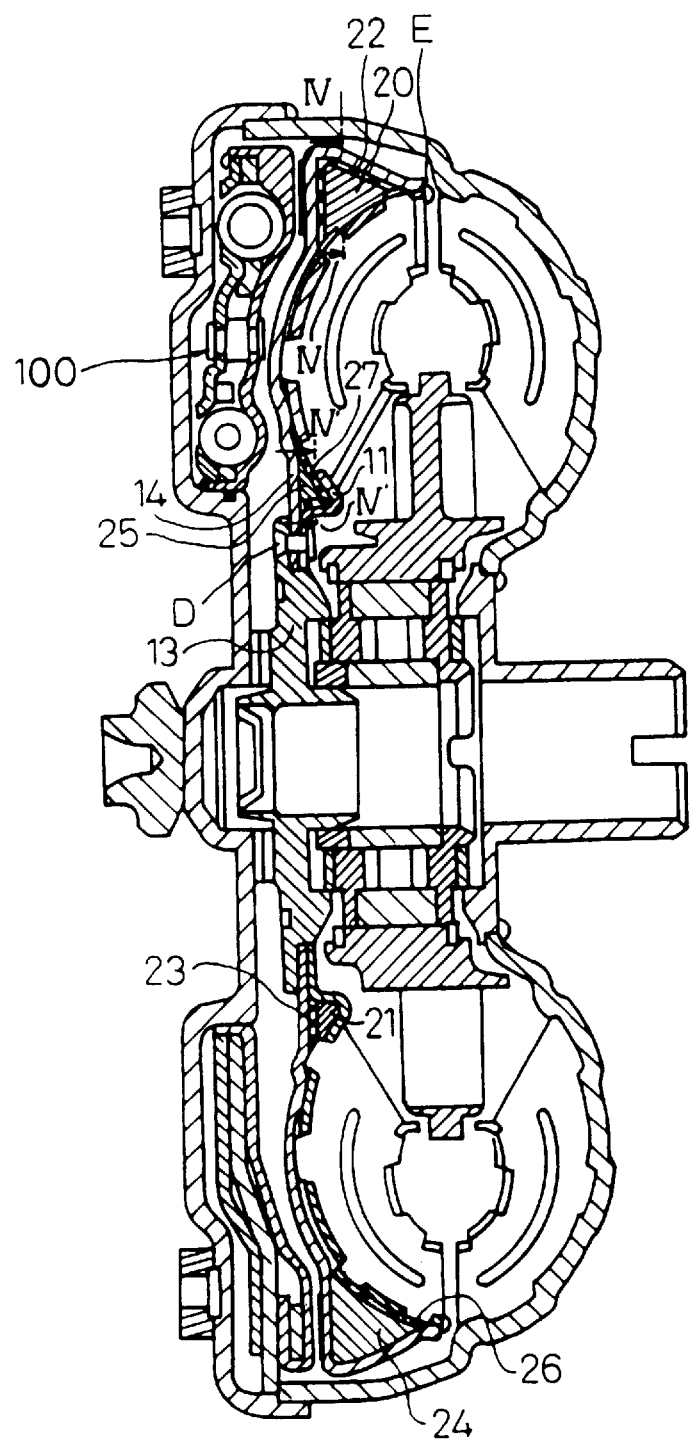
FIG. 15 is a partial sectional side view of the tenth embodiment.
Figure 16:
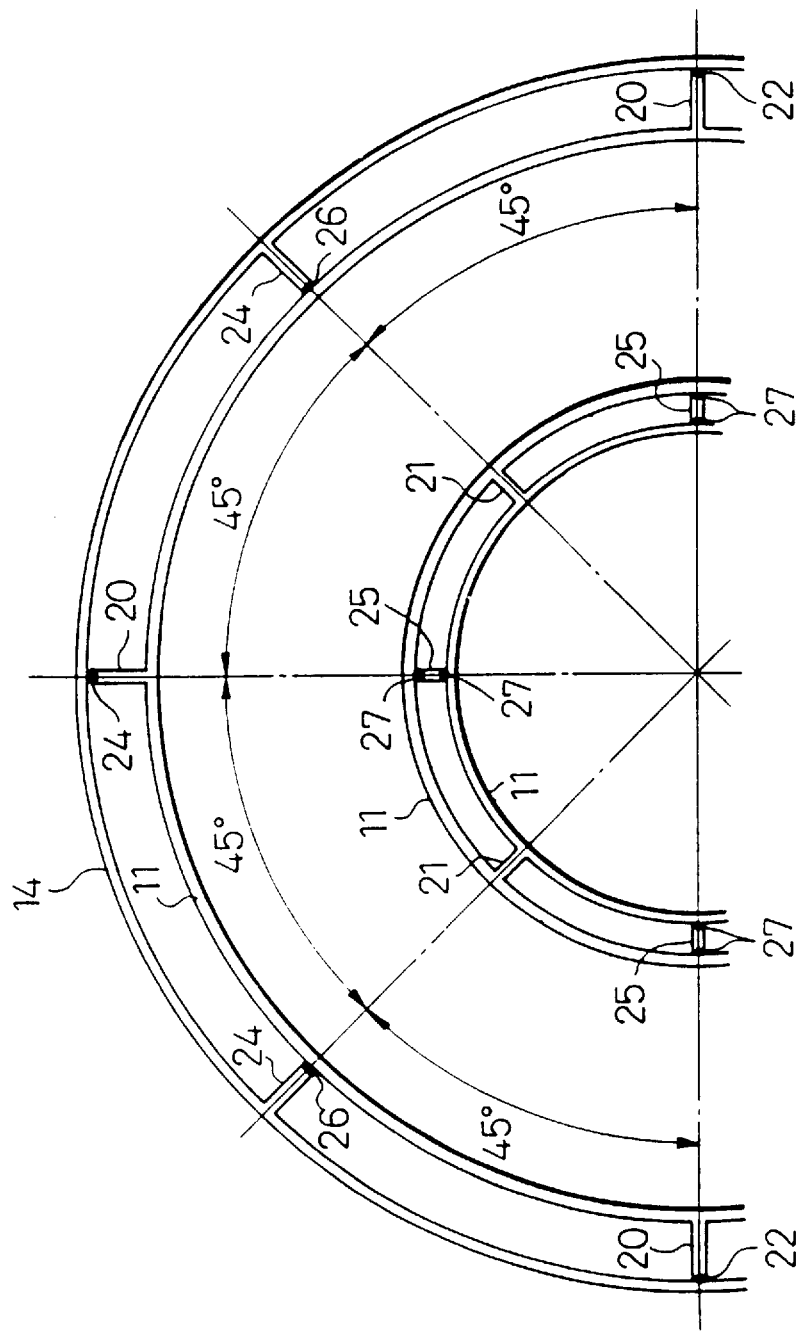
FIG. 16 is a partial sectional view of a driven plate and turbine shell taken along the line IV—IV and IV'—IV' of FIG. 15.

In the tenth embodiment of the present invention shown in FIG. 15 and FIG. 16, ribs 20 and 21 which are fixed to the outer surface of the turbine shell 11 at one or two sides and contact the driven plate 14 at the remaining sides, and ribs 24 and 25 which are fixed to the driven plate 14 at one or two sides and contact the outer surface of the turbine shell 11 at the remaining sides, are disposed alternately.

According to the above described tenth embodiment of the present invention, a higher rigidity of turbine shell 11 and drive plate 14 is attainable, and torque transmission would be improved compared to the eighth or ninth embodiments, because the ribs are disposed around the circumference at locations 45 degrees apart.

Figure 17:
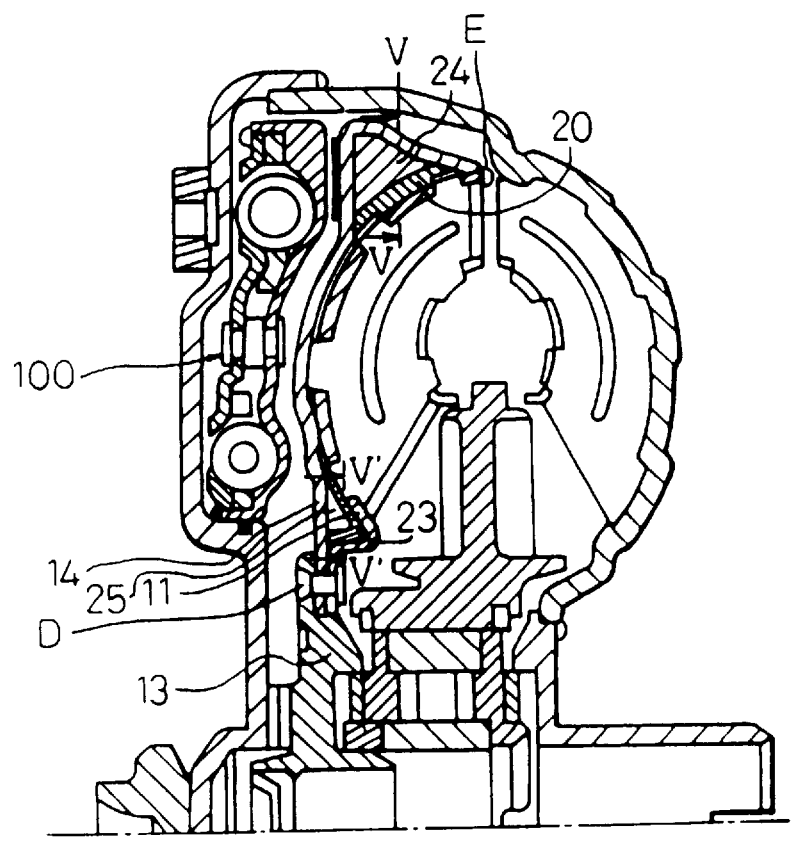
FIG. 17 is a partial sectional side view of the eleventh embodiment.

In the eleventh embodiment of the present invention shown in FIG. 17 and FIG. 18, ribs 20 and 21, which are fixed to the outer surface of the turbine shell 11 at one or two sides, and ribs 24 and 25, which are fixed to the driven plate 14 at one or two sides, are so disposed that ribs 20 and ribs 24, and ribs 21 and ribs 25 respectively contact each other at their circumferential side surfaces.

Therefore, according to the above described eleventh embodiment of the present invention, it is possible to eliminate the seal members, as compared to the eighth, ninth or tenth embodiments.

We claim:

1. A fluid coupling with a lock-up clutch, comprising:
    a front cover connected to an input shaft;
    an impeller shell connected to said front cover;
    a hub connected to an output shaft;
    a turbine shell connected to said hub;
    a driven plate assembly disposed near the outer surface of said turbine shell and having a driven plate connected to said hub, an annular friction surface disposed on the surface of the front cover side of said driven plate;
    a drive disc assembly disposed between said front cover and said driven plate assembly and connected to said front cover and having a friction surface disposed toward and selectively engageable with said annular friction surface disposed on said driven plate;
wherein said driven plate is connected to said turbine shell at a radially inner end portion and at a radially outer end portion covering the whole outer surface of said turbine shell.

2. A fluid coupling with a lock-up clutch according to claim 1, wherein ribs are disposed, in the spaces formed between said driven plate and the outer surface of said turbine shell, at substantially equal intervals around the circumference.

3. A fluid coupling with a lock-up clutch according to claim 2, wherein said ribs are fixed to the outer surface of said turbine shell at a part of its periphery and contact, through seal members, said driven plate at the remaining periphery.

4. A fluid coupling with a lock-up clutch according to claim 2, wherein said ribs are fixed to said driven plate at a part of its periphery and contact, through seal members, the outer surface of said turbine shell at the remaining periphery.

5. A fluid coupling with a lock-up clutch according to claim 2, wherein some of said ribs are fixed to said driven plate at a part of its periphery and contact, through seal members, the outer surface of said turbine shell at the remaining periphery, and the other ribs are fixed to the outer surface of said turbine shell at a part of its periphery and contact, through seal members, said driven plate at the remaining periphery.

6. A fluid coupling with a lock-up clutch according to any one of claim 3 to 5, wherein said seal members are disposed on the periphery of said ribs.

7. A fluid coupling with a lock-up clutch according to any one of claim 3 to 5, wherein said seal members are disposed on both the circumferential side surfaces of the radially end portions of said ribs.

8. A fluid coupling with a lock-up clutch according to claim 2, wherein ribs which are fixed to said driven plate at a part of its periphery and ribs which are fixed to the outer surface of said turbine shell at a part of its periphery contacts each other at a circumferential side surface.

9. A fluid coupling with a lock-up clutch according to claim 1, wherein the inner end of said driven plate and the inner end of said turbine shell closely contact each other and are connected to said hub by riveting.

10. A fluid coupling with a lock-up clutch according to claim 1, wherein the inner end of said driven plate is connected by welding to the inner end of said turbine shell which is connected to said hub by riveting.

11. A fluid coupling with a lock-up clutch according to claim 1, wherein the inner end of said driven plate is connected to said hub by welding and the inner end of said turbine shell is connected to said hub by riveting.

12. A fluid coupling with a lock-up clutch according to claim 11, wherein the inner end of said driven plate is connected to said hub by riveting and the inner end of said turbine shell is connected to the inner end of said driven plate by riveting.

* * * * *